United States Patent
Gilstring (10) Patent No.: US 10,798,871 B2
(45) Date of Patent: Oct. 13, 2020

(54) ROTOR ASSEMBLY, METHOD, FEEDER DEVICE AND AGRICULTURAL IMPLEMENT FOR FEEDING GRANULAR OR POWDER MATERIAL

(71) Applicant: Väderstad Holding AB, Väderstad (SE)

(72) Inventor: Gert Gilstring, Vadstena (SE)

(73) Assignee: Väderstad Holding AB, Väderstad (SE)

( * ) Notice: Subject to any disclaimer, the term of this patent is extended or adjusted under 35 U.S.C. 154(b) by 176 days.

(21) Appl. No.: 16/076,475

(22) PCT Filed: Feb. 7, 2017

(86) PCT No.: PCT/SE2017/050112
§ 371 (c)(1),
(2) Date: Aug. 8, 2018

(87) PCT Pub. No.: WO2017/138867
PCT Pub. Date: Aug. 17, 2017

(65) Prior Publication Data
US 2019/0045705 A1    Feb. 14, 2019

(30) Foreign Application Priority Data
Feb. 8, 2016   (SE) ...................................... 1650153

(51) Int. Cl.
*A01C 7/08*    (2006.01)
*A01C 7/12*    (2006.01)

(52) U.S. Cl.
CPC .............. *A01C 7/081* (2013.01); *A01C 7/125* (2013.01)

(58) Field of Classification Search
CPC .. A01C 7/081; A01C 7/08; A01C 7/00; A01C 7/125; A01C 7/123; A01C 7/12
See application file for complete search history.

(56) References Cited

U.S. PATENT DOCUMENTS 3,489,321 A    1/1970   Kirschmann
4,231,495 A    11/1980  Lund
(Continued)

FOREIGN PATENT DOCUMENTS

DE    483798 C    9/1929
DE    4411000 C1    3/1995
(Continued)

OTHER PUBLICATIONS

Spirit 1 Manual, Vaderstad (Sep. 14, 2015).
Spare Parts List, Vaderstad (Oct. 26, 2015).

*Primary Examiner* — Christopher J. Novosad
(74) *Attorney, Agent, or Firm* — Coats & Bennett PLLC (57) ABSTRACT

A rotor apparatus for feeding granular or powdered material in an agricultural implement, the rotor apparatus being designed to be received in a partially cylindrical feeder space of a feeder device for volumetric feeding. The rotor apparatus comprises an insert part, which in size and shape is adapted to be inserted into the feeder space and to substantially prevent air from passing the insert part when this is inserted into the feeder space, and a rotor, which is rotatable relative to the insert part. The insert part defines a rotor space, in which the rotor is rotatable, and the rotor is together with the insert part designed to provide an air lock. The insert part comprises a wall portion interacting with the rotor and located radially outside the radially outermost portion of the rotor.

20 Claims, 10 Drawing Sheets (56) References Cited

U.S. PATENT DOCUMENTS

| | | | |
|---|---|---|---|
| 4,259,032 | A | 3/1981 | Kuhner |
| 4,379,664 | A | 4/1983 | Klein et al. |
| 5,024,356 | A | 6/1991 | Gerling et al. |
| 5,189,965 | A | 3/1993 | Hobbs et al. |
| 5,845,818 | A | 12/1998 | Gregor et al. |
| 2008/0295751 | A1 | 12/2008 | Shoup et al. |

FOREIGN PATENT DOCUMENTS

| | | |
|---|---|---|
| DE | 102011010619 A1 | 8/2012 |
| EP | 0094583 B1 | 9/1983 |
| EP | 2039233 A1 | 3/2009 |
| EP | 2468084 A1 | 3/2014 |
| WO | 2008150241 A1 | 12/2008 |
| WO | 2012119868 A1 | 9/2012 |

ROTOR ASSEMBLY, METHOD, FEEDER DEVICE AND AGRICULTURAL IMPLEMENT FOR FEEDING GRANULAR OR POWDER MATERIAL

TECHNICAL FIELD

This document relates to a rotor apparatus, a feeder device and an agricultural implement for feeding granular or powdered material.

Furthermore, the document relates to a method for feeding granular or powdered material in an agricultural implement.

BACKGROUND

There are a number of agricultural implements designed to distribute granular material on the ground on which the agricultural implement is traveling. For example, such granular material can be seed, fertilizer and/or pesticides.

Particularly with regard to seed there are a variety of different grain sizes. Rape seeds, for example, are very small while seeds for grain, such as wheat, barley, oat and rye, are usually larger. In addition, the density with which different types of seed should be distributed varies.

In particular, seed drills with a greater working width often have one or more central containers from which the material is fed by gravity to a feeder comprising a metering rotor, which is rotatable in a feeder space in a feeder housing. The metering rotor determines the rate at which the material is fed to an air channel where the material is taken up by an air stream and then carried to one or more distributors that distribute the material onward to a number of furrow openers, possibly via intermediate singulating devices or flow-equalizing devices.

One challenge with such seed drills is to utilize the created air flow fully, not least to reduce the use of energy but also to avoid having to over-dimension the fan or fans that are used to create the air flow.

A potential weakness in such a system is the mixing in of the material. Principally, there are three different strategies to prevent part of the air flow from disappearing via the feeder: (i) to seal the container, which involves providing the filler opening of the container with a seal-tight lid for instance; (ii) to prevent the air flow from getting past the feeder; and (iii) to provide a vacuum below the feeder using a Venturi nozzle.

The strategy described under (ii) has been found to have good potential for achieving energy-efficient feeding. However, some challenges still remain.

One such challenge is to provide a feeder that is flexible enough to handle a large range of seed sizes and a large range of feed-out rates.

A known feeder, shown in the applicant's instruction manual "*Väderstad Spirit series ST*400-9005, *ST*4000", 902612-sv, 2015 Aug. 14. This feeder has a feed roller or rotor which substantially takes up the entire axial length of the feeder space and which has vanes that also substantially extend over the entire axial length of the rotor. The vanes have a radial length amounting to more than 30% of the radius of the rotor viewed from a geometrical center of rotation.

For smaller seed sizes, such as rape seeds, the rotor can be replaced with a "rape seed rotor" which includes an insert that takes up the greater part of the axial length of the feeder space, and which has a rotatable rotor relative to the insert that extends over less than 25% of the axial length of the feeder space and which has radial protrusions that each extend over less than half the axial length of the rotor and over less than 20% of the radius of the rotor.

There is a need for an improved feeder, especially with respect to flexibility and air-tightness in the reverse direction.

SUMMARY

A general object of the invention is therefore to provide a feeder which is improved in the above respects.

The invention is defined by the attached independent claims. Embodiments are set forth in the dependent claims, in the description that follows and in the accompanying drawings.

According to a first aspect, a rotor apparatus for feeding granular or powdered material in an agricultural implement is provided, the rotor apparatus being designed to be received in a partially cylindrical feeder space of a feeder device for volumetric feeding. The rotor apparatus comprises an insert part, which in size and shape is adapted to be inserted into the feeder space and to substantially prevent air from passing the insert part when this is inserted into the feeder space, and a rotor, which is rotatable relative to the insert part. The insert part defines a rotor space, in which the rotor is rotatable, and the rotor is together with the insert part designed to provide an air lock. The insert part comprises a wall portion interacting with the rotor and located radially outside the radially outermost portion of the rotor.

"Substantially prevent air from passing the insert part" means that only an amount of air which is negligible in the context can pass between the insert part and the inward walls of the feeder space. Preferably, such leakage is fully prevented.

Here, "air lock" means that the rotor seals the insert part relatively, so that no air, or very little air, can pass in the reverse direction of the rotor.

With the insert part and the rotor forming an air lock, and the insert part having a wall portion radially outside of the rotor, it is possible to provide a feeder that utilizes a rotor whose diameter can be selected freely. With a rotor having a smaller diameter it is possible to run it at a higher rotational speed at a given displacement. A large diameter requires shallow cells (spaces between the rotor blades/vanes) to provide a small displacement. However, deeper cells are preferable as their degree of filling is more even. Variations in degree of filling arise when the seed meets limitation surfaces, such as the blades, the bottom and the wall portion. Therefore, the variation in degree of filling is greater for shallow cells compared to deep cells.

The wall portion interacting with the rotor may have a surface directed toward the rotor space, which surface is in sealing contact with the radially outermost portion of the rotor.

Here, "sealing contact" means a contact that prevents flow-through of air in the reverse direction of the rotor.

The surface directed toward the rotor space may comprise a first wall portion, which may be curved, preferably with a circular curvature, and which extends across an angle around the rotational axis of the rotor amounting to less than 210°, preferably less than 180°.

The surface directed toward the rotor space may comprise a second wall portion, which may be curved, preferably with a circular curvature, and which extends across an angle around the rotational axis of the rotor amounting to less than 150°, preferably less than 120° or less than 100°.

An axial surface of the rotor can be in sealing contact with an axial limitation wall of the rotor space.

Axial limitation walls can be provided on both sides of the rotor space. The limitation wall can be substantially annular with a radial extent that corresponds to a radial length of the rotor blades. For example, the radial extent of the limitation wall can be 95-150% of the axial length of the rotor blades.

The axial limitation wall can have a clearing part, set up to trap and preferably lead away particles or debris caught between the rotor and the axial limitation wall.

Such a clearing part may comprise one or more edges arranged in the axial limitation wall, whose extent runs across the limitation wall. The edge can delimit an axial opening, ridge or recess, so that material which is scraped off the rotor by the edge can be carried in a direction radially outward through the opening along the ridge or in the recess.

An upper portion of the insert part may have at least one inlet to the rotor space, wherein the inlet comprises a surface of repose that provides an angle of repose downward to the rotor space.

The wall portion, or its tangent, can have a minimum angle to the horizontal plane, which is less than 60°, preferably less than 50°, less than 40° or less than 30°. However, the angle can preferably be greater than 5°, greater than 10°, greater than 15° or greater than 20°.

One or more wall portions can incline downward to the inlet, substantially parallel to the axial direction of the insert part. An additional wall portion or additional wall portions can incline downward to the inlet, substantially perpendicular to the axial direction of the insert part.

The inlet to the rotor space may comprise at least one inlet edge extending along the axial length of the rotor and having an angle of 5° to 85° toward an axial direction, preferably 10° to 80° or 10° to 70°.

Preferably, the edge is at a downstream part of the inlet, i.e. at the part of the inlet where the material is drawn into the rotor space.

Such an edge can contribute to granules that risk getting trapped at the top of the rotor blades being moved to the side and gliding out of the grip of the rotor without being damaged.

An outlet opening from the rotor space can have an increasing axial width, viewed in a direction parallel to a direction of rotation of the rotor at the outlet opening.

The insert part can have a space separate from the rotor space in an axial direction, which has a downward opening and which has a material bridge inclined downward toward the opening, which delimits a space substantially in the shape of a sector of a circle in the insert part.

The wall inclined toward the opening may be in the form of a wall that is separate from the wall that forms the general cylindrical form of the insert part. Preferably, the wall inclined toward the opening has an angle to a horizontal plane, which angle is greater than an angle for a tangent of the wall that forms the general cylindrical form of the insert part, at the lowest portion of this wall.

The insert part can have at least one fixing part for fixing the insert part relative to the feeder space.

The fixing part can comprise one or more radial protrusions or recesses, which can extend along the entirety or parts of the axial length of the insert part and which can interact with one or more protrusions, recesses, edges, ledges or similar in the feeder space. The fixing part can be formed to ensure that a predetermined mutual orientation between the feeder space and the insert part is maintained during operation.

The insert part can be formed of at least two insert part portions, which are able to be joined together in a detachable manner.

The insert part portions may have outer diameters of substantially the same size.

A joint between the insert part portions can be provided in the rotor space so that the joining of the insert part portions rotatably fixes the rotor in the rotor space. The actual joint can be provided using an optional joint, such as a screw joint, snap-on fittings or a bayonet-type joint between the insert part portions, or using separate fastening means, such as a screw, a bolt or similar.

The axial lengths of the insert part portions can be x:1−x, where x is 15%-50%.

The rotor may comprise at least two rotor portions, which include a set of rotor blades respectively, evenly distributed around the circumference of the rotor, and the rotor blade sets are angularly offset relative to each other by an angle which is less than 360°/N, where N is the number of rotor blades of one of the rotor portions.

The rotor portions preferably have the same number of rotor blades. The angle is preferably 360°/2N+/−10%.

The rotor may further comprise a radially extending wall, which separates the rotor blade sets from each other.

The rotor apparatus may further comprise a closure part, whose position relative to the insert part is adjustable in at least one axial direction to control the amount of material that is fed to the rotor.

The rotor can have an outer diameter of circumference that is less than an outer diameter of the insert part, preferably less than 90% or less than 80% of the outer diameter of the insert part.

The rotor may comprise an outer metering part and an inner hub part, the hub part being made from a stiffer material than the metering part.

For example, the hub part can have a higher elasticity modulus than the metering part.

According to a second aspect, a method for feeding granular or powdered material from an agricultural implement to the ground on which the agricultural implement is traveling is provided. The method comprises arranging a rotor apparatus as described above in a feeder space of a feeder device associated with an agricultural implement, and using the rotor apparatus arranged in the feeder device to feed the material from a container to a channel for air-flow-based transport of the material.

During the above-mentioned feeding, an air pressure in the container can differ from the ambient air pressure of the agricultural implement by less than 1%, preferably less than 0.5%, and an air pressure in the channel can differ from the ambient air pressure by more than 1-15%, preferably more than 2-10%.

Here "the channel" means the part of the channel located underneath the rotor, i.e. the part of the channel in which the material fed by the rotor is taken up by the air stream.

It will be appreciated that it is desirable for the pressure in the channel to be as low as possible, as the difference in pressure across the feeder is then minimized.

According to a third aspect, a feeder device for feeding granular material from a container to a channel for air-flow-based transport of the granular material in an agricultural implement is provided. The feeder device comprises a feeder space, which is adapted to receive a metering rotor and a rotor apparatus as described above, wherein the rotor apparatus is positionable in the feeder space, so that air leakage from the channel past the feeder device to the container during operation is <30 m$^3$/h, preferably <15 m$^3$/h.

Conventional devices leak considerably more than 30 m³/h in the reverse direction of each feeder device.

Under normal conditions, an air flow in the channel amounting to approximately 400-500 m3/h can be provided. Therefore, the leakage past the feeder device, using the concept shown herein, can be maintained below 6%, preferably below 3%, below 1% or even below 0.5% of the air flow achieved in the channel.

This air leakage is the leakage that follows the rotor cells after these are emptied and return to be filled with new material. Any other leakage is negligible.

According to a fourth aspect, an agricultural implement for spreading granular material on the ground on which the agricultural implement is traveling, comprising a feeder device as described above, is provided.

DETAILED DESCRIPTION

Figure 1A:
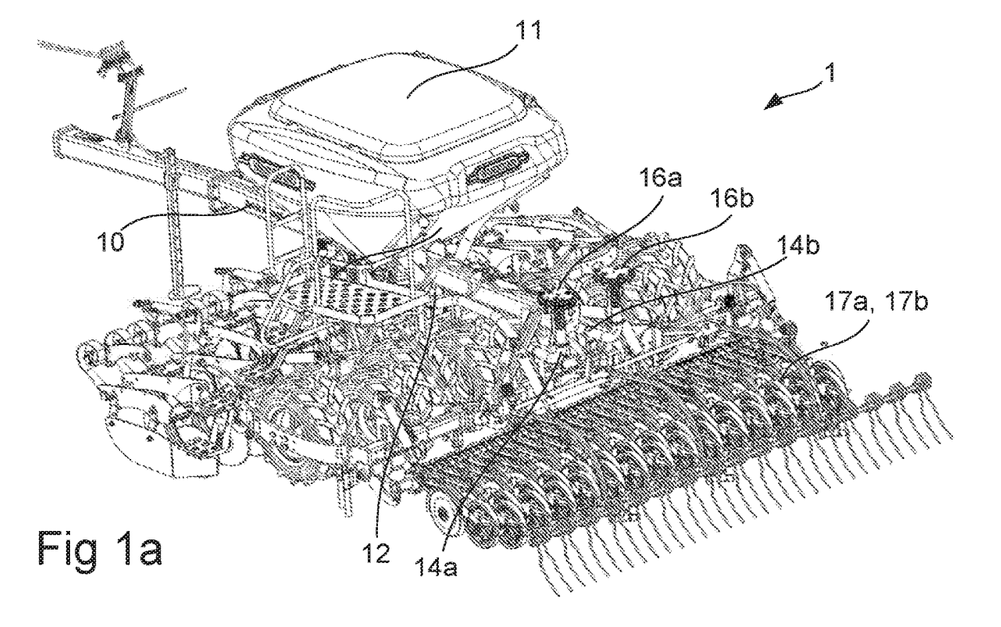
FIG. 1*a* is a schematic view of an agricultural implement.

FIG. 1*a* shows an overview of an agricultural implement 1 in the form of a seed drill, which comprises a frame 10, a seed container 11, a feeder device 12 for volumetric feeding of seed from the seed container to a pneumatic feed system. The pneumatic feed system comprises a fan (not shown) that generates an air flow, a pair of channels 14*a*, 14*b* that lead the air flow to the feeder device 12 and that lead a seed-mixed air-flow onward to a respective distributor 16*a*, 16*b*. The distributors 16*a*, 16*b* are arranged to lead the seed-mixed air-flow to a respective furrow-opener 17*a*, 17*b*, possibly with a singulating device (not shown) or other flow-equalizing device between them.

Figure 1B:
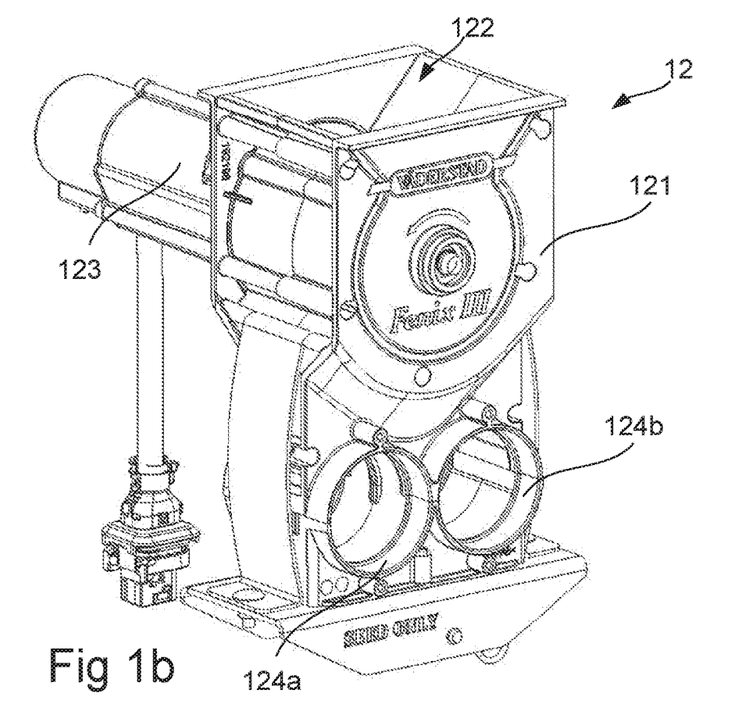
FIG. 1*b* is a schematic illustration of a feeder device.

FIG. 1*b* shows a feeder device 12, which comprises a feeder housing 121 with an inlet 122, a drive unit 123, here in the form of an electric motor, and a pair of channel portions 124*a*, 124*b*, in which outlets from the feeder device exit.

The channels 14*a*, 14*b* connect to the channel portions 124*a*, 124*b* of the feeder device 12.

Figure 2:
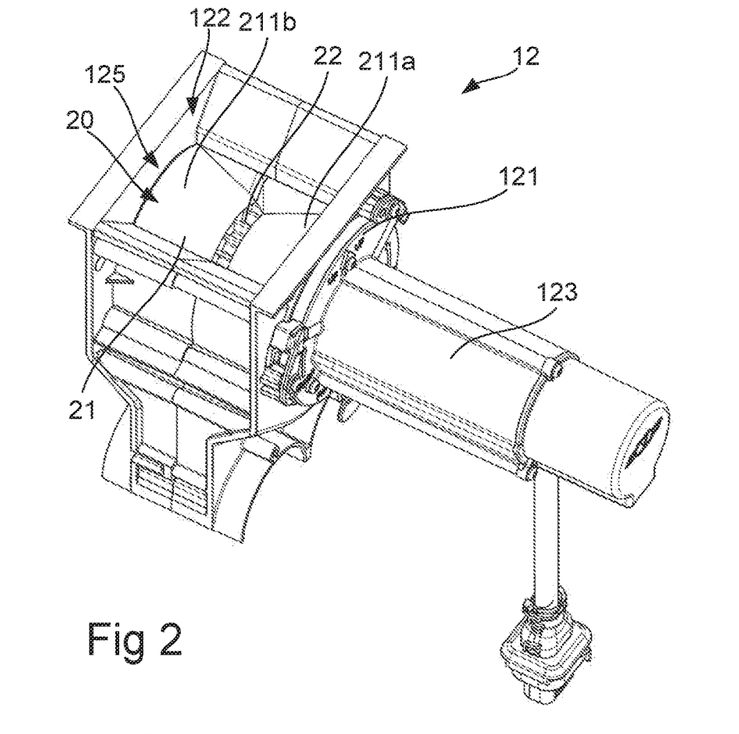
FIG. 2 shows a feeder device according to a first embodiment.

FIG. 2 shows a perspective view of a feeder device 12 according to a first embodiment. This feeder device is of a so-called volumetric type, i.e. it feeds material using a metering rotor which comprises a plurality of rotor blades 221, between which a plurality of circumferential compartments 227 with a predetermined volume are defined.

The metering rotor is accommodated in a feeder housing 121, which defines a feeder space 125, with a generally cylindrical form, i.e. a cylindrical form with the exception of the inlets 122 and outlets. A drive unit 123 is connected to the rotor to bring this to rotate in the feeder housing. Such a drive unit can comprise an electric motor, as shown, but it can also comprise a hydraulically or pneumatically driven motor. As an additional alternative, the drive unit can be connected to a mechanical ground-following device.

The lower portion of the seed container 11 is connected to the inlet 122 of the feeder device, and one or more of the air channels 14*a*, 14*b* are connected to the outlet of the feeder device.

It will be appreciated that a feeder device 12 can thus serve one or more air channels 14*a*, 14*b*. In addition, an agricultural implement 1 can comprise one or more feeder devices 12 that are connected to one or more seed containers 11.

During normal operation of the feeder device, for example for crops with large seeds and/or where a large volume per time unit needs to be fed, a metering rotor (not shown) is used which substantially fills up the entire cylindrical space defined in the feeder housing. The metering rotor is removable and exchangeable through an opening in the end wall of the feeder housing, whereby the metering rotor can be moved in an axial direction into or out of the feeder space.

In the feeder device shown in FIG. 2, such a metering rotor (not shown) has been replaced by an insert apparatus 20, which comprises an insert part 21, fixed in the feeder space, and a rotor 22 which is rotatable relative to the insert part 21.

Figure 3A:
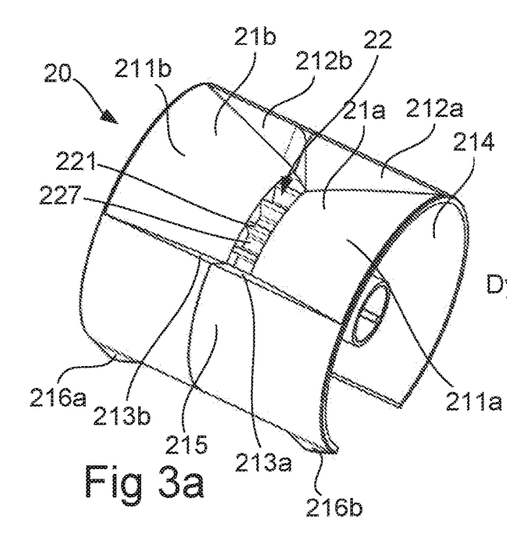
FIGS. 3*a*-3*f* show a rotor insert according to a first embodiment.
Figure 3B:
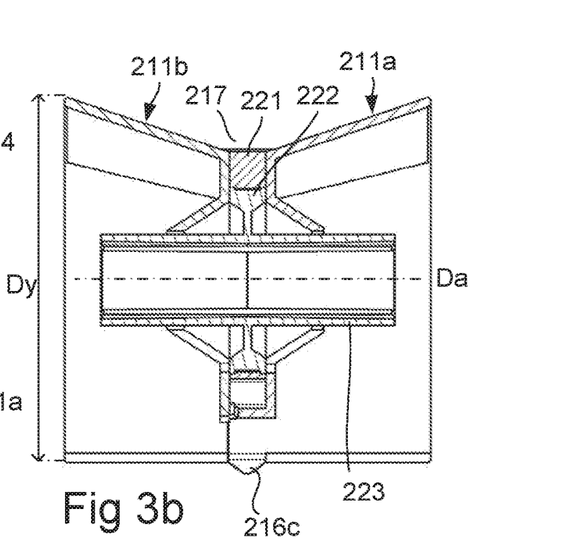
Figure 3C:
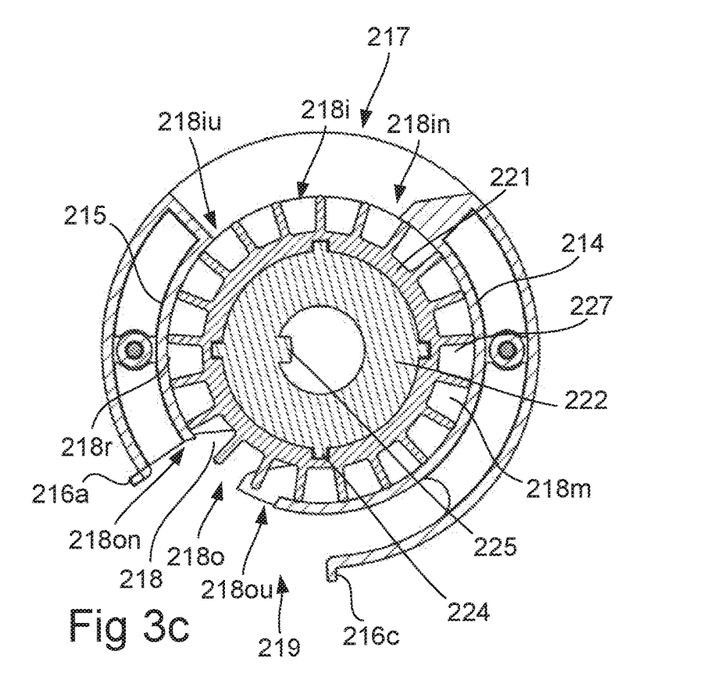
Figure 3D:
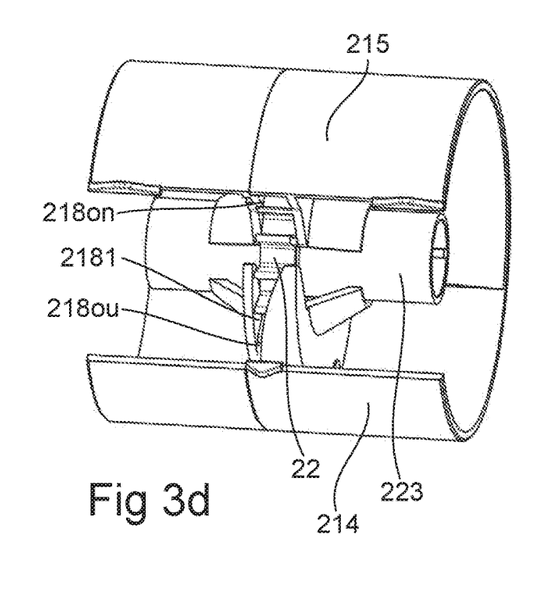
Figure 3E:
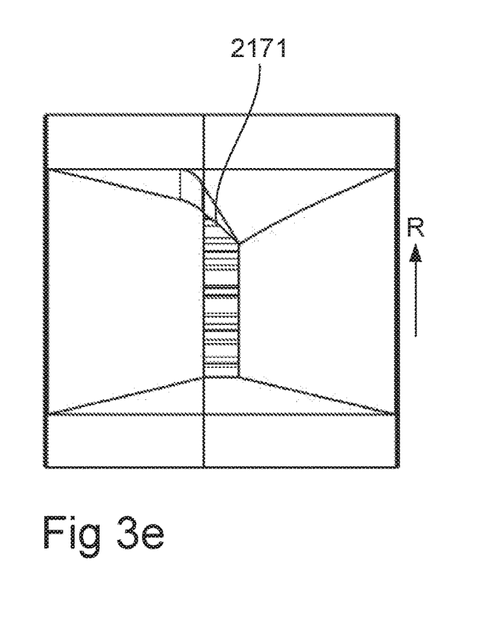
Figure 3F:
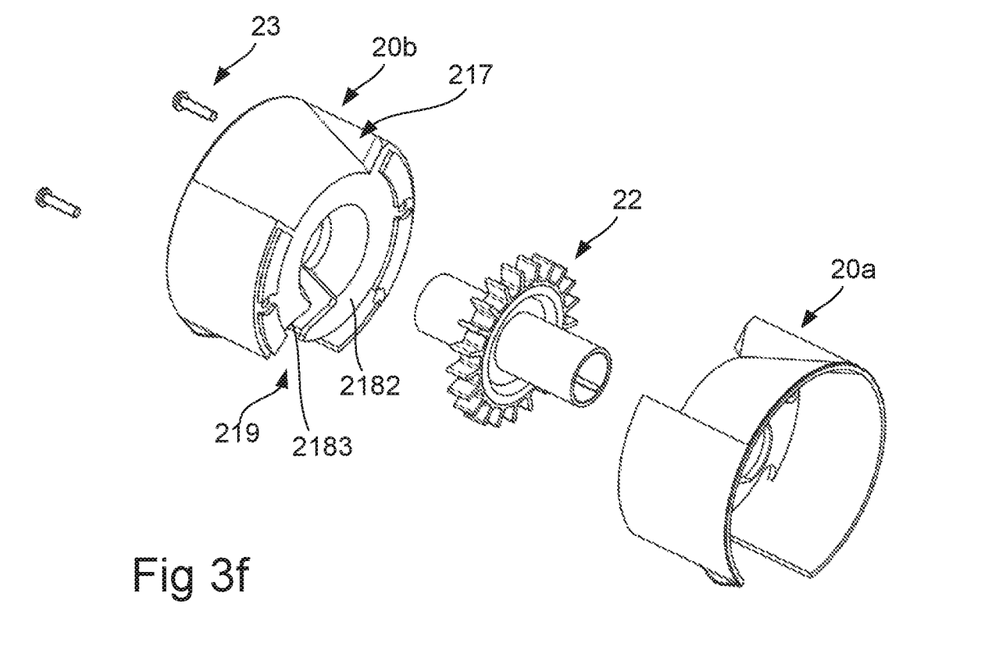

The insert apparatus 20 is shown in closer detail in FIGS. 3*a*-3*e*, and an exploded view of the insert apparatus 20 is shown in FIG. 3*f*.

As will be seen in FIGS. 3*a*-3*f*, the insert apparatus 20 has a generally cylindrical outer form, which is adapted to the form of the substantially cylindrical space that forms the feeder space 125. The insert part 20 has an outer diameter Dy, which is equal to or somewhat smaller than the inner diameter of the feeder space, so that the insert part is insertable in an axial direction into the feeder space so that no air, or a negligible amount of air, can pass between the outer wall 214, 215 of the insert part 20 and the inner wall of the feeder space 125. It is possible to arrange one or more sealing strips (not shown) between the insert part and the walls of the feeder space. Such sealing strips can be integrated with the outer walls of the insert part.

As will be seen in FIG. 3*a*, the insert part has an inlet portion 217 with upwardly facing surfaces of repose 211*a*, 211*b*, 212*a*, 212*b*, 213*a*, 213*b* which, viewed in the axial direction, incline downward to a rotor space that accommodates the rotor 22, so that material which is fed from, for example, a seed container 11 will slide down toward the rotor 22 in order to be fed onward by this. The surfaces of repose can be planar, convex or concave, viewed in a plane perpendicular to the axial direction. They can also be planar, convex or concave viewed in a vertical plane containing the center of rotation for the rotor.

The surfaces of repose 211*a*, 211*b*, 212*a*, 212*b*, 213*a*, 213*b* can thus comprise surfaces 211*a*, 211*b* on respective axial sides of the rotor.

As a complement, the surfaces of repose can comprise surfaces 212*a*, 212*b*, 213*a*, 213*b* which incline in a direction which is substantially perpendicular to the surfaces located on the above-mentioned axial sides of the rotor. These surfaces are thus located on respective sides of the inlet of the rotor space, viewed in a direction perpendicular to the axial direction Da.

The surfaces of repose 211*a*, 211*b*, 212*a*, 212*b*, 213*a*, 213*b* thus incline downward to a rotor inlet 218*i* (FIG. 3*c*). An inlet 218*i* for the rotor space 218 can be said to have an upstream portion 218*iu* and a downstream portion 218*in*, where the rotor 22, viewed from above, moves from the upstream portion 218*iu* to the downstream portion 218*in*. At the upstream portion 218*iu*, therefore, the empty rotor compartments 227 appear in order to be filled with material, and at the downstream portion 218*in* the material is drawn into the rotor space.

The rotor space 218 can comprise a feeder portion 218*m*, in which the rotor compartments are substantially filled with material, and a return portion 218*r*, in which the rotor compartments are substantially empty. The feeder portion 218*m* is formed between the rotor and a feeder portion wall 214, which can extend approximately 90°-210°, preferably approximately 150°-180°, around the axis of rotation Da. The return portion 218*r* can be formed between the rotor and a return portion wall 215, which can extend approximately 120°-70°, preferably approximately 80°-100°, around the axis of rotation.

It will be appreciated that, at the return portion, one or more ventilation channels to the surroundings are provided, so that any overpressure in the rotor cells can be vented off.

At the downstream portion 218*in*, an inlet edge 2171 (FIG. 3e) can be arranged, which has a direction of 5°-85° relative to the direction of rotation R. Preferably, the edge 2171 has a direction which is 20°-70° or 30°-60° relative to the direction of rotation R. The inlet edge can extend across the entire axial length of the rotor.

With reference to FIG. 3c, the rotor can be formed in one piece, of two or more joined-together parts or of parts formed by means of multi-component injection molding.

According to the shown embodiment, the rotor 22 can comprise a radially outer portion 221, which forms the rotor blades, and a radially inner portion 222, which forms a hub and possibly also a part of a drive shaft 223. The inner portion 222 can have a higher stiffness, typically achieved in a higher elasticity modulus, than the outer portion 221. The other portion 221 can, for example, be formed in a soft and elastic polymer material, for example a rubber elastic material. The inner portion 222 can be formed in a thermoset or a thermoplastic. The inner and outer portions 221, 222 can be provided with joints 224 in the form of, for example, radial protrusions and/or recesses to prevent relative rotation between the portions 221, 222.

The inner portion 222 can also be provided with joints 225 to prevent rotation relative to a drive shaft from the drive unit 123. Such joints 225 can also comprise radial protrusions and/or recesses.

At the lower portion of the insert part 21, an outlet 219 is provided for the material that is fed by the rotor 22. An outlet 218*o* from the rotor space 218 can, analogous to the inlet 218*i*, have an upstream portion 218*ou* and a downstream portion 218*on*, where the rotor 22, viewed from below, moves from the upstream portion 218*ou* to the downstream portion 218*on*, and where the upstream portion 218*ou* is the portion at which compartments 227 filled with material come from the inlet 217, and where the downstream portion is the portion where substantially empty compartments return via the return portion to be filled.

The outlet 218*o* from the rotor space can have an opening 2181 with a width increasing from the upstream portion 218*ou* in a direction toward the downstream portion 218*on*. For example, the width of the opening 2181 can increase from zero via a width that is less than the minimum granular diameter which the apparatus is intended for. The width can increase to a width corresponding to the axial width of the rotor or even more. The width can increase across a length, viewed in the circumferential direction of the rotor, than is greater than the corresponding length of two rotor compartments, preferably corresponding to a length of three or four rotor compartments. The width can increase linearly, degressively or progressively.

Furthermore, the insert part 21 itself can have an outlet opening 219, which has a greater opening area than the outlet of the rotor space. The outlet opening of the insert part can be substantially equal in size to the outlet opening of the feeder space 125, so that these substantially coincide with each other.

The insert apparatus 20 can be provided with means 216*a*, 216*b*, 216*c* to prevent rotation relative to the feeder space, i.e. to ensure that the inlet of the insert apparatus always coincides with the inlet of the feeder space. Such means may comprise hooks, pins or similar that are formed to engage with for example existing edges of the feeder space. For example, such hooks or pins can engage with edges formed between the cylindrical wall portions of the feeder space and their inlets and/or their outlets.

An alternative is to allow the above-mentioned means to engage with a clearing groove in the cylindrical wall portion of the feeder space.

As an additional alternative, one or more specific orientation parts can be provided in the feeder space, wherein corresponding parts are provided on or in the insert apparatus.

With reference to FIG. 3*f*, the insert apparatus 20 can be formed by a pair of parts 20*a*, 20*b*, which can be joined together in an axial direction Da so that the rotor space 218 is formed between the two parts 20*a*, 20*b*. The parts can thus form axially adjacent portions of the insert apparatus 20.

The joining together of the parts 20*a*, 20*b* can be achieved in a number of different ways. For example, the parts can be equipped with integrated interacting engagement means, such as threads, bayonet couplings or snap-on couplings. As an alternative, or as a complement, the parts can be joined together using separate fastening means 23, such as screws, nuts, retaining pins, clamps or similar.

Preferably, the joining together is achieved in a reversible way, so that the parts can be disconnected in order to be replaced, or for cleaning and/or for renewing the rotor.

It can also be seen in FIG. 3*f* how an axial wall 2182 that forms the rotor space 218 can be equipped with an edge 2183, which is formed in such a way that particles that have gotten caught between the rotor and the axial wall 2182 are scraped off from the rotor 21 and can be carried radially outward to the outlet 219.

Figure 4A:
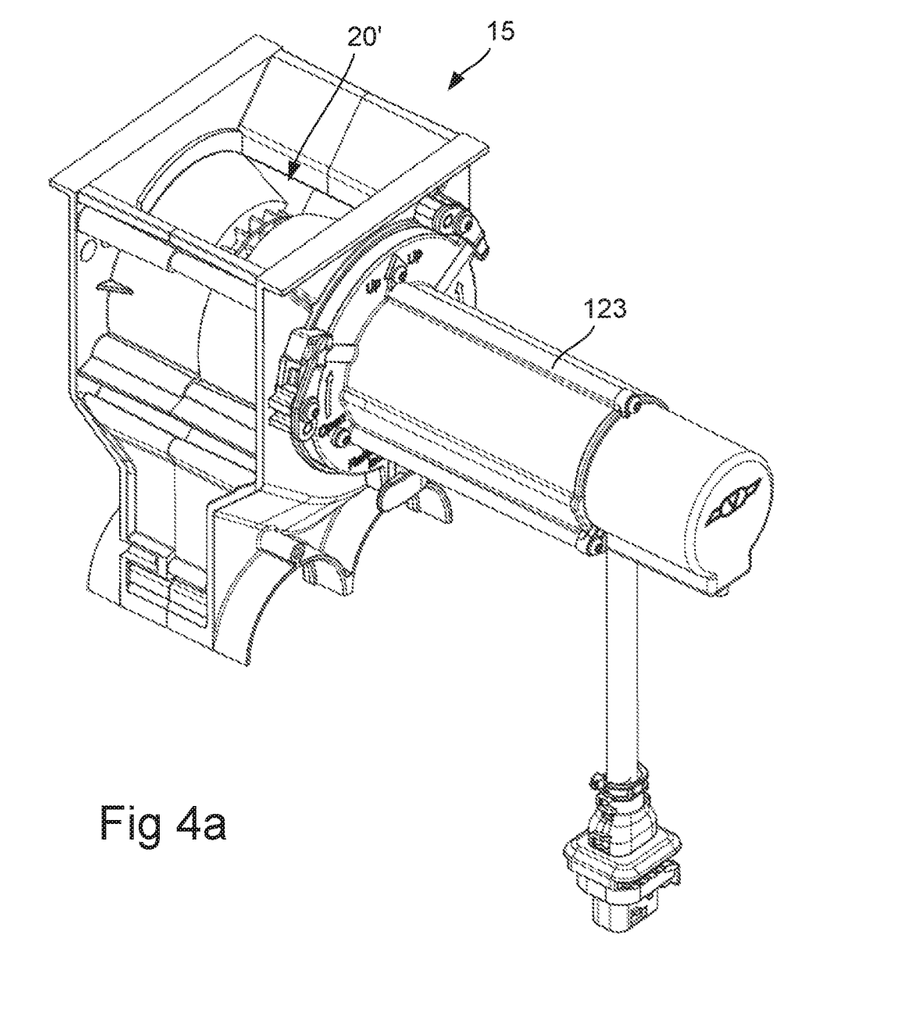
FIGS. 4*a*-4*c* show a feeder device according to a second embodiment.
Figures 4B, 4C:
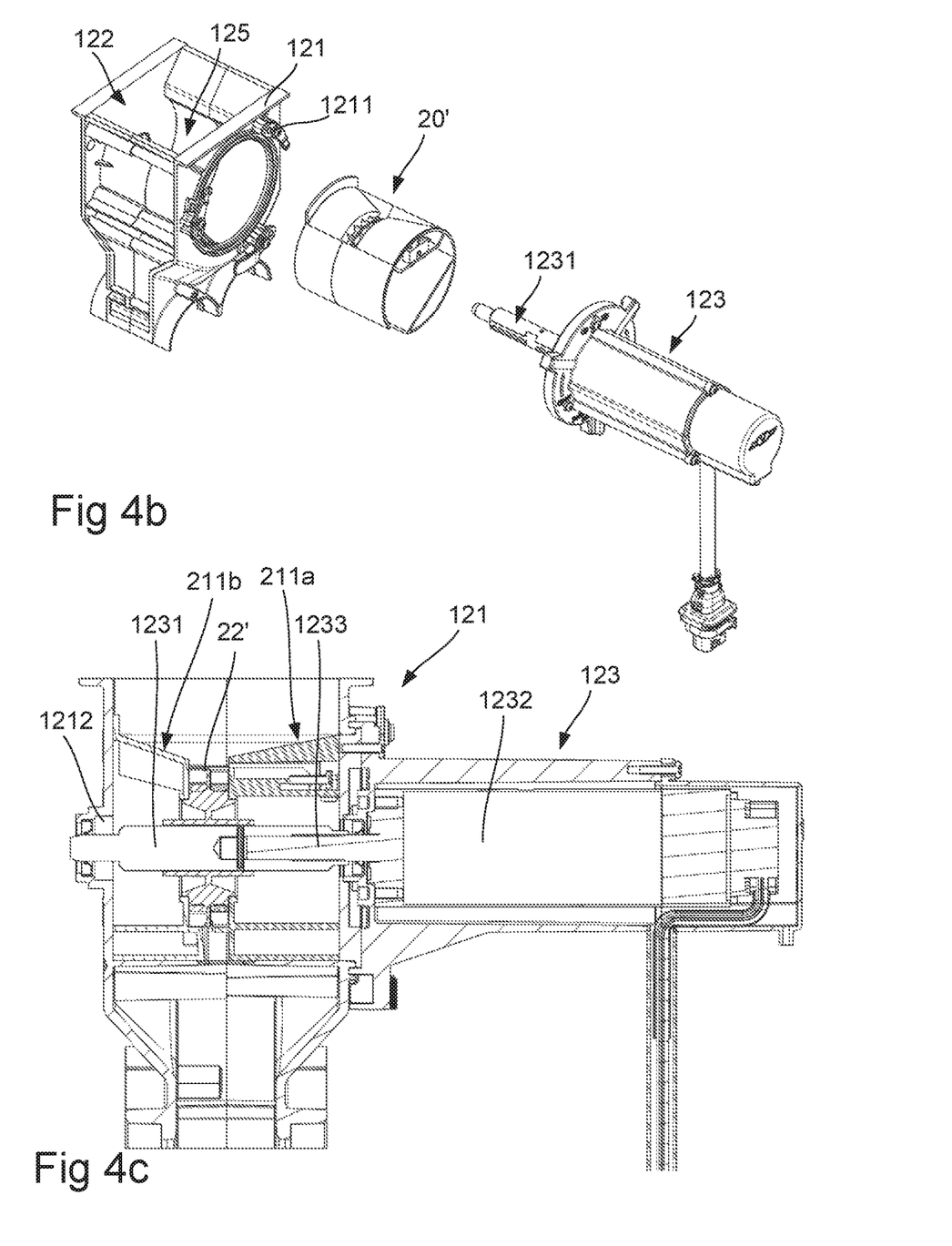

In FIGS. 4*a*-4*c* a feeder device 15 with another exemplary embodiment of the insert apparatus 20' is shown.

It can be seen in FIG. 4*b* how the drive unit 123 with the drive shaft 1231 can be detached from the feeder housing 121 in order for the insert apparatus to be taken out, for example to be installed or removed, for renewal, maintenance or cleaning.

It can be seen in FIG. 4*c* how the drive unit 123 can be built, here with an electrical motor 1232. An outgoing motor shaft 1233 can be provided with an extension which forms a drive shaft 1231 for an ordinary metering rotor or for an incoming rotor of the insert apparatus.

The drive shaft 1231 can be a through shaft, so that a distal end of this engages with a bearing unit 1212 on the axially opposing side of the feeder space 125.

The drive unit 123 can be attached to the feeder housing using screws, pins, detent hooks, rotating hooks 1211 or any other detachable mechanical attachment, for example as shown in FIG. 4*b*.

What is shown herein with respect to the feeder housing 121 and the drive unit 123 can be applied irrespective of the embodiment of the actual insert apparatus 20, 20'.

FIGS. 5*a*-5*j* show an insert apparatus 20' according to a second embodiment.

In this embodiment, the rotor 22' is modified compared to the embodiment shown in FIGS. 3a-3f. Here, the rotor 22' has two sets of rotor blades 221a, 221b, which are separated by a radially extending wall 226. Each of the rotor blade sets has evenly distributed spaced rotor blades, which between each pair of adjacent rotor blades define the respective compartments 227. Each of the rotor blade sets 221a, 221b can be formed according to the description for the rotor in FIGS. 3a-3f.

The radially extending wall 226 can have a radial extent which is equal in size to the radial extent of the rotor blades. The wall can extend from the proximal portion of the rotor blades in a radial direction to their distal portions.

The rotor blades can be fixed to the wall or movable relative to the wall.

In a special case, the rotor blades can be formed from one and the same piece of material as the wall 226.

Alternatively, the extent of the wall can be slightly less than the axial extent of the rotor blades, especially in a case where the rotor blades are intended to be deformed somewhat as a result of their bearing against the cylindrical wall 214, 215 of the rotor space.

The rotor blade sets 221a, 221b can be formed as identical to each other. The rotor blade sets can possibly be offset relative to each other in the circumferential direction of the rotor. Such an offset can correspond to an angle of 36072N+/−25%, preferably +/−10%, where N is the number of rotor blades in one rotor blade set.

The rotor 22' shown in FIGS. 5a-5j can be used in insert apparatus 20 according to FIGS. 3a-3f, wherein it reduces pulsations when feeding the granular material.

Furthermore, the insert apparatus 20' shown in FIGS. 5a-5j comprises an axially displaceable hatch 24, which is formed so that it can fully or partly close the inlet for at least one rotor blade set 221a, 221b, so that the feeding capacity of the rotor can be reduced.

As shown in FIGS. 5a-5j, the hatch 24 can be accommodated in a space 241 in one of the parts 20a', 20b' that forms the insert part 20'. This space can be completely separated from the rest of the part 20a', 20b', for example, by a wall 242. For example, this wall 242 can have a substantially horizontal extent inside the part 20a', 20b'. By providing a gap 243 facing the inlet of the rotor space, the shape of which corresponds to the cross-sectional shape of the hatch 24, the hatch can be fully or partly retracted into the part 20a', 20b'.

Operation of the hatch 24 can be achieved through an axial opening of the insert part, for example from its short side, and preferably from the short side that is closest to the drive unit.

Operation itself can be achieved in any desired manner, for example using screws 244, as shown.

A material bridge 245 can be provided in one, or both, of the parts 20a', 20b' forming the insert part 20', which material bridge 245 forms a larger angle to a horizontal plane than a tangent to the wall 214 of the insert part where this meets the outlet 219 of the insert part. The material bridge 245 can extend from the edge of the wall of the insert part located nearest the outlet 219 and upward to a part of the wall of the insert part which is located on a higher vertical level.

The material bridge 245 may form a wall, which divides the space in the part into two completely separate parts 246, 247, of which one 247 forms a separate space, which, viewed in a cross section, may have the shape of a circular segment.

In the embodiment shown in FIGS. 5a-5j, an orientation part 216d is arranged in the form of a flange at one axial end of the insert part, which flange extends upward in the direction of the inlet 122 of the feeder space. The flange can have an extent viewed along the circumferential direction of the axial end, which corresponds to a width of the inlet 122 of the feeder space.

Such a flange can be provided instead of, or as a complement to, the orientation parts 216a-216c shown with reference to FIGS. 3a-3f.

Figure 5A:
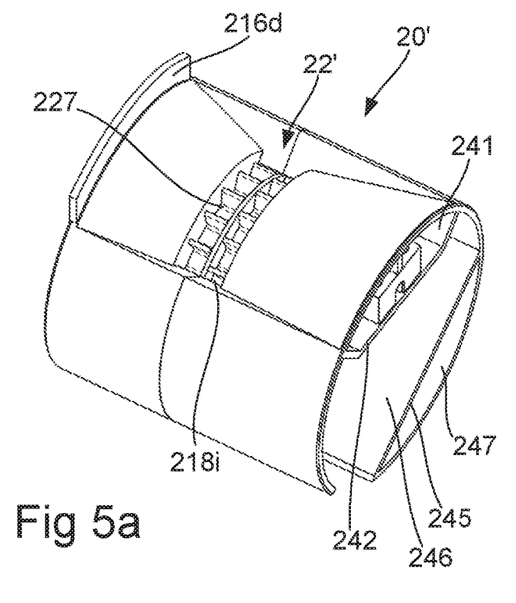
FIGS. 5*a*-5*j* show a rotor insert according to a second embodiment.
Figure 5B:
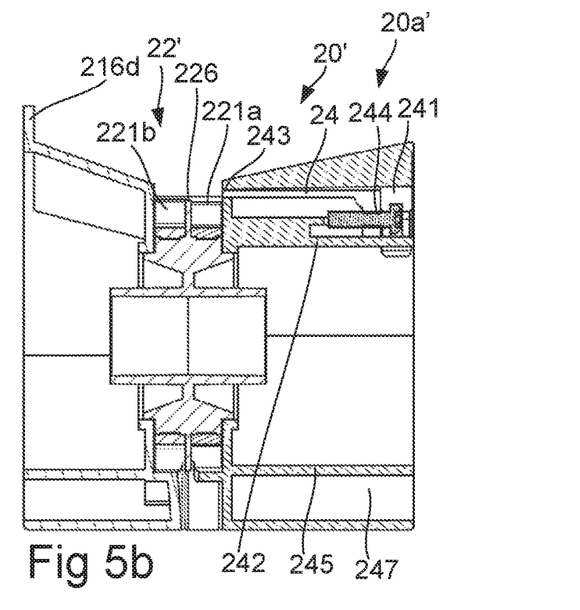
Figure 5C:
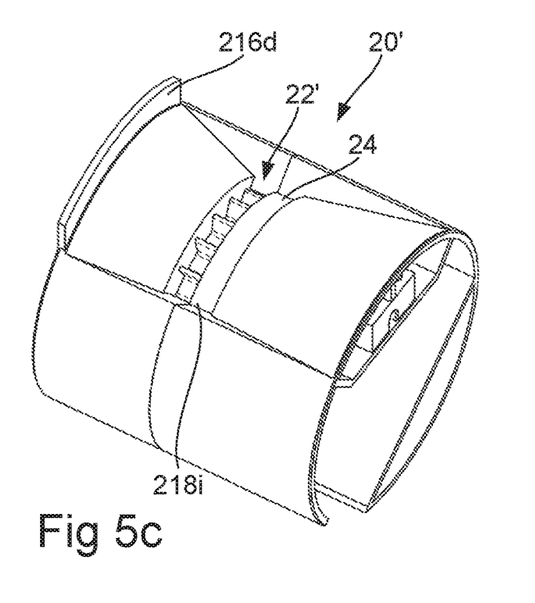
Figure 5D:
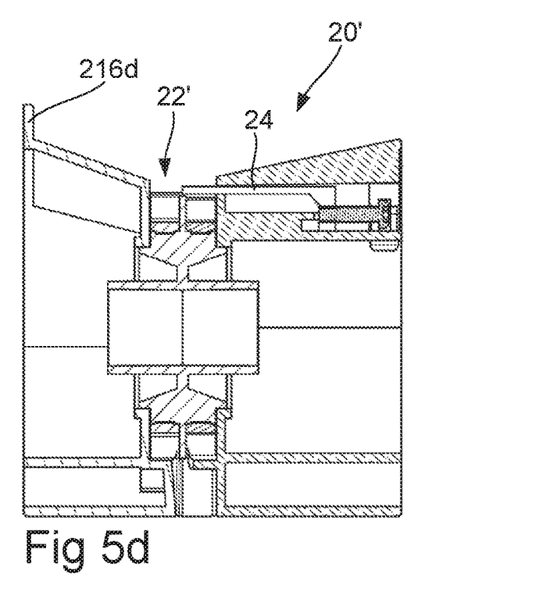

FIGS. 5a and 5b show the insert apparatus 20' in a first state, where the opening 218i to the feeder space is completely open, and FIGS. 5c and 5d show the insert apparatus 20' in a second state, where the opening 218i is partly blocked, so that only one of the rotor sets 221b can be used for feeding.

Figure 5E:
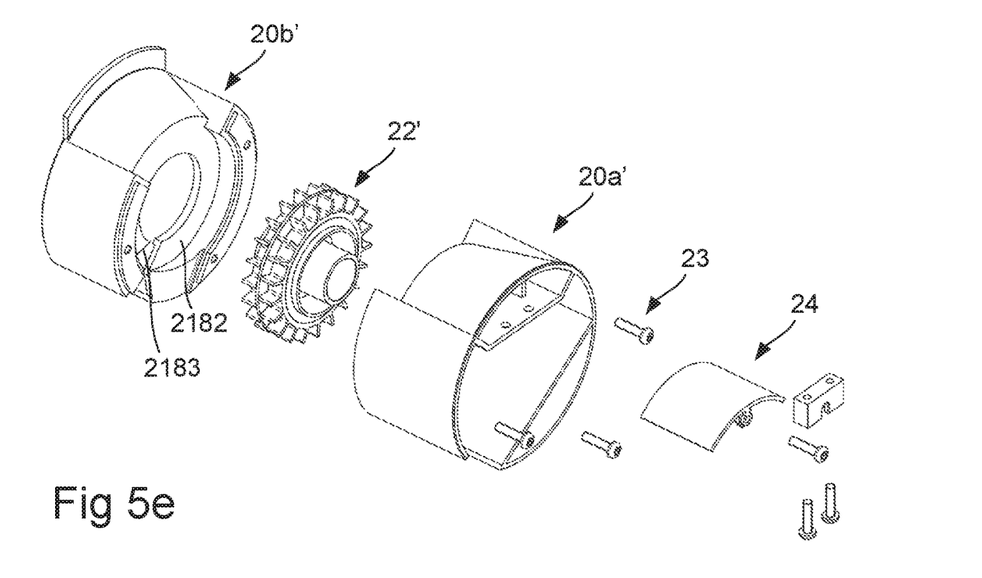

FIG. 5e shows an exploded view of the insert apparatus 20'.

Figure 5F:
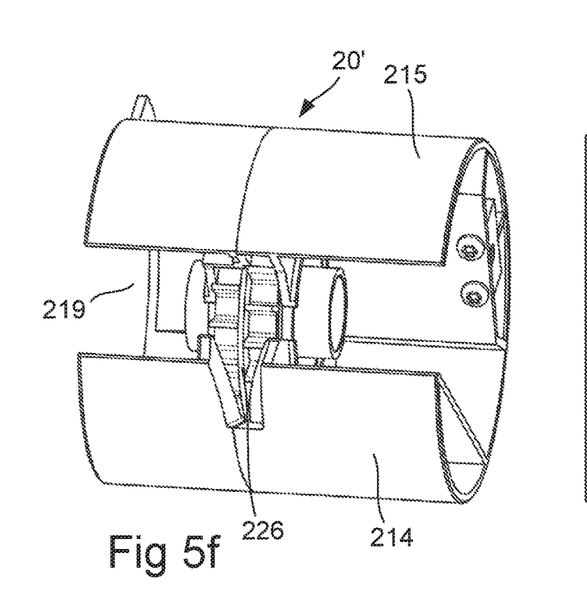
Figure 5G:
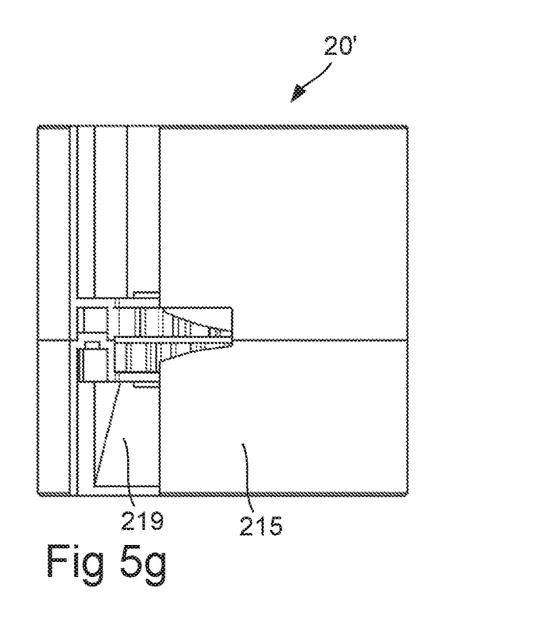

FIGS. 5f-5g show the insert apparatus 20' viewed from below. Here it is shown how an opening 218o from the outlet of the rotor has an increasing width. More specifically, the opening may be symmetrically formed around one with the radially extending wall 226 of the rotor 22', so that on each side of the wall 226, there is an opening from a upstream portion 218ou to a downstream portion 218on with increasing width.

Figure 5H:
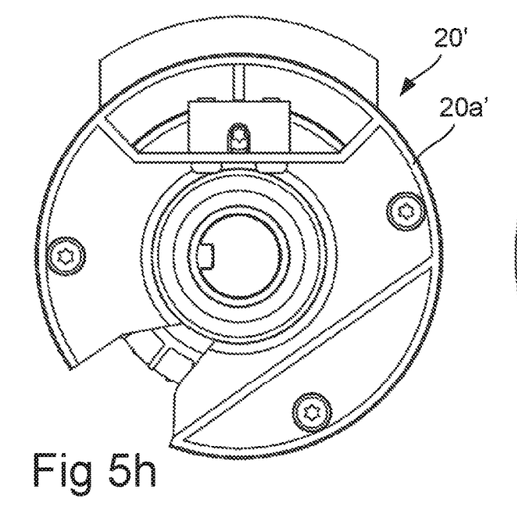

FIG. 5h shows one of the parts 20a' viewed from its axial end, specifically from the end at which the space 241 is accessible for setting the position of the hatch 24.

Figure 5I:
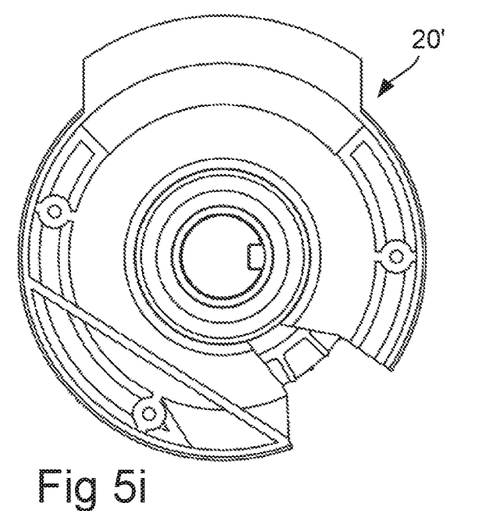

FIG. 5i shows the other part 20b' viewed from its axial end.

Figure 5J:
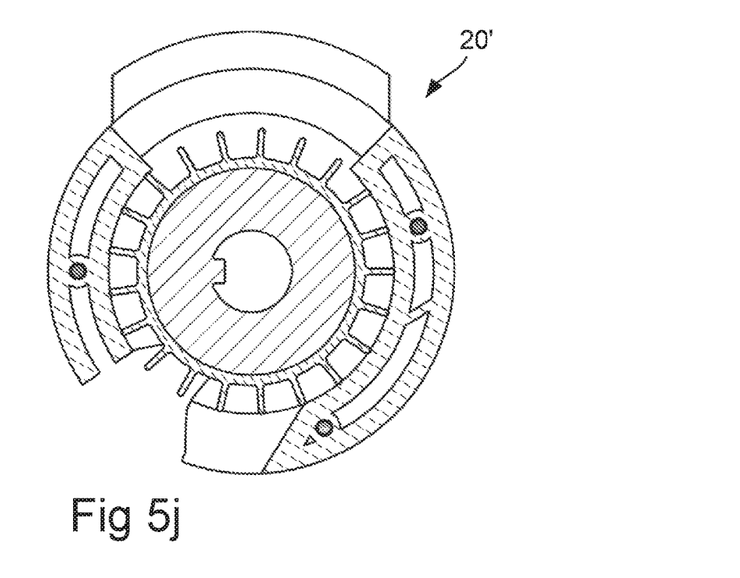

FIG. 5j shows a cross section through the feeder space and viewed in the direction toward the other part 20b'.

With reference to FIGS. 6a-6d, a rotor 22" with two or more sets of rotor blades can be provided, which can be separated by one or more radially extending walls.

Figure 6A:
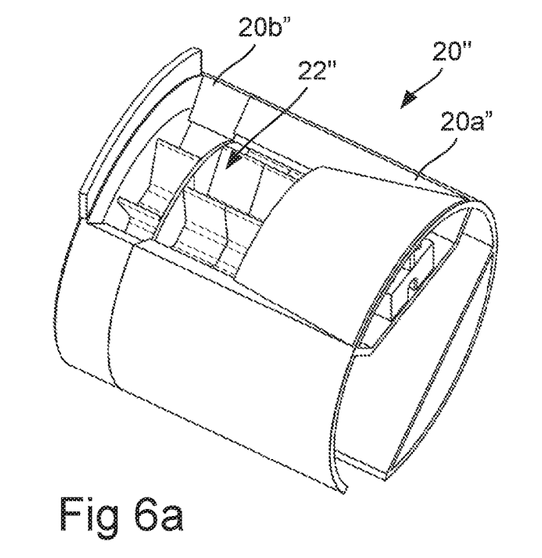
FIGS. 6*a*-6*d* show a rotor insert according to a third embodiment.
Figure 6B:
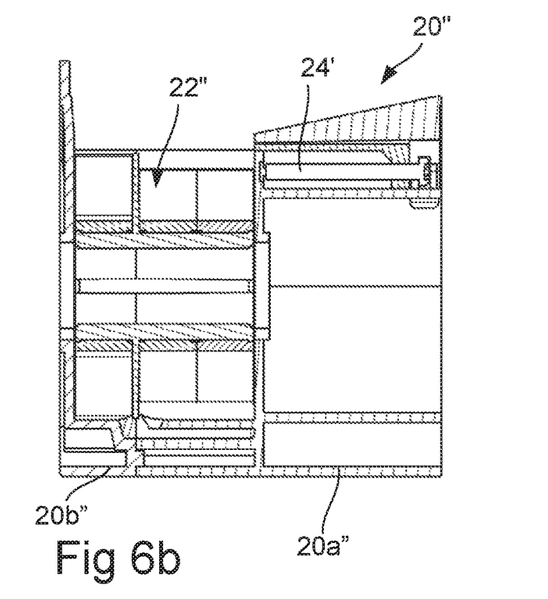
Figure 6C:
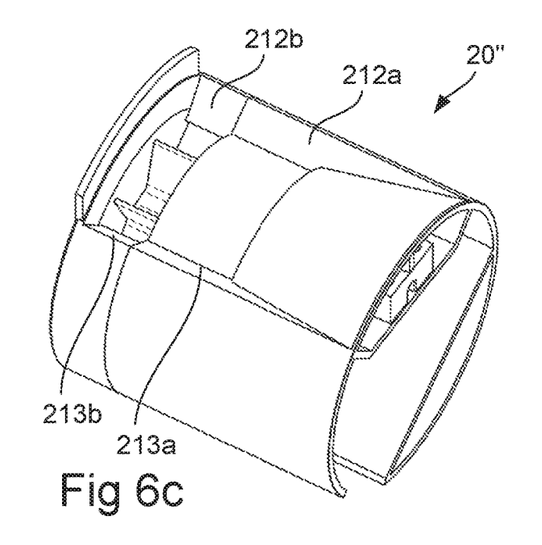
Figure 6D:
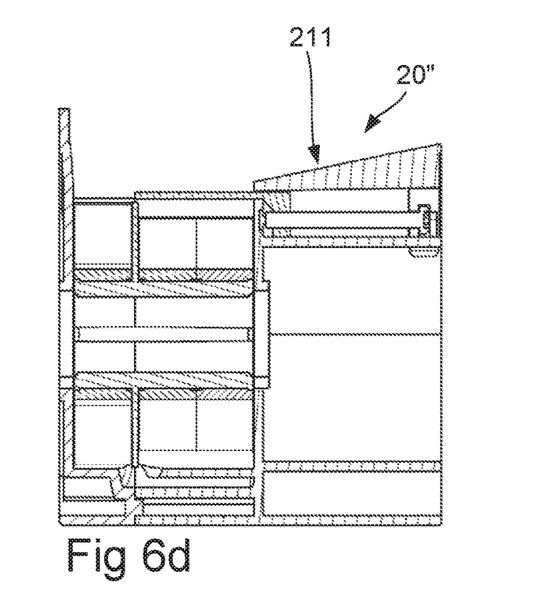

FIGS. 6a and 6b show the insert apparatus 20" in a first state, where the opening 218i to the feeder space is completely open, and FIGS. 6c and 6d show the insert apparatus 20' in a second state, where the opening 218i is partly blocked, so that only one of the rotor blade sets 221b can be used for feeding.

Also in this embodiment, a displaceable hatch 24' can be provided. Furthermore, the insert part 20" may be formed by a pair of parts 20a", 20b".

As shown in FIGS. 6a-6d, the inlet to the rotor space can be offset laterally to ensure that the portion which is formed adjacent to the inlet is sufficiently long in the axial direction, so that it can accommodate the hatch fully when it is in the retracted position.

In this embodiment, only one greater surface of repose 211 can be found, which is axially adjacent to the inlet of the rotor space. In addition, there are two smaller, and preferably steeper surfaces of repose 212a, 212b, 213a, 213b, which are located on each side of the rotor space, viewed perpendicular to the axial direction.

The hatch 24' and its function can be provided in the same way as shown with reference to FIGS. 5a-5j.

It will be appreciated that even without the function as an air lock, the hatch shown herein can be used to control the capacity of a feeder device. Thus a rotor apparatus 20, 20', 20" for feeding granular or powdered material in an agricultural implement 1 is provided, which rotor apparatus is formed to be received in a partly cylindrical feeder space 125 of a feeder device 12 for volumetric feeding, wherein the rotor apparatus 20, 20', 20" comprises an insert part 21, which in size and shape is adapted to be inserted into the feeder space and to prevent air from passing the insert part when this is inserted into the feeder space, and a rotor 22, 22', 22", which is rotatable relative to the insert part. The rotor comprises a radially extending wall 226, which divides the rotor into a pair of axially separated portions. Each of the portions can have a set of rotor blades, or feeder protrusions. Such a rotor apparatus may further comprise a closure part 24, whose position relative to the insert part 20a', 20a" is adjustable in at least one axial direction to control the amount of material that is fed to the rotor 22, 22', 22".

The invention claimed is:

1. A rotor apparatus for feeding granular or powdered material in an agricultural implement, the rotor apparatus being designed to be received in a partially cylindrical feeder space of a feeder device for volumetric feeding, wherein the rotor apparatus comprises:
   an insert part, having a generally cylindrical outer form, which in size and shape is adapted to be inserted into the partially cylindrical feeder space and to substantially prevent air from passing the insert part when the insert part is inserted into the partially cylindrical feeder space, and
   a rotor, which is rotatable relative to the insert part,
   wherein the insert part defines a rotor space, within which the rotor is rotatable, wherein the rotor is designed to provide an air lock together with the insert part,
   wherein the insert part comprises a wall portion interacting with the rotor and being located radially outside a radially outermost portion of the rotor, and
   wherein the insert part has an inlet portion, inside said generally cylindrical outer form, with at least one upwardly facing surface of repose, which when viewed in an axial direction, inclines downward to the rotor space, so that granular or powdered material which is fed from a seed container when in use, will slide down toward the rotor in order to be fed onward by the rotor.

2. The rotor apparatus according to claim 1, wherein the wall portion interacting with the rotor has a surface directed toward the rotor space, which surface is in sealing contact with the radially outermost portion of the rotor.

3. The rotor apparatus according to claim 1, wherein an axial surface of the rotor is in sealing contact with an axial limitation wall of the rotor space.

4. The rotor apparatus according to claim 3, wherein the axial limitation wall has a clearing part, set up to trap and preferably lead away particles or debris caught between the rotor and the axial limitation wall.

5. The rotor apparatus according to claim 1, wherein an inlet to the rotor space comprises at least one inlet edge extending along an axial length of the rotor and having an angle of 5° to 85° toward an axial direction.

6. The rotor apparatus according to claim 1, wherein an outlet opening from the rotor space (218) has an increasing axial width, viewed in a direction parallel to a direction of rotation of the rotor at the outlet opening.

7. The rotor apparatus according to claim 1, wherein the insert part has a space separate from the rotor space in an axial direction, which has a downward opening and which has a material bridge inclined downwardly toward the downward opening, which delimits a space substantially in the shape of a sector of a circle in the insert part.

8. The rotor apparatus according to claim 1, wherein the insert part has at least one fixing part for fixing the insert part relative to the partially cylindrical feeder space.

9. The rotor apparatus according to claim 1, wherein the insert part is formed of at least two insert part portions, which are able to be joined together in the axial direction in a detachable manner, so that the rotor space is formed between the two insert part portions.

10. The rotor apparatus according to claim 9, wherein an axial length of each insert part portion is x:1−x, where x is 15%-50% of an axial length of the insert part.

11. The rotor apparatus according to claim 1, wherein the rotor comprises at least two rotor portions which include a set of rotor blades respectively, distributed around a circumference of the rotor, and the rotor blade sets of at least two rotor portions are angularly offset relative to each other by an angle which is less than 360°/N, where N is the number of rotor blades of one of the at least two rotor portions.

12. The rotor apparatus according to claim 11, further comprising a radially extending wall, which separates the rotor blade sets of the at least two rotor portions from each other.

13. The rotor apparatus according to claim 1, further comprising a closure part, whose position relative to the insert part is adjustable in at least an axial direction to control an amount of granular or powdered material that is fed to the rotor.

14. The rotor apparatus according to claim 1, wherein the rotor has an outer diameter of circumference that is less than an outer diameter of the insert part.

15. The rotor apparatus according to claim 1, wherein the rotor comprises an outer metering part and an inner hub part, the inner hub part being made from a stiffer material than the outer metering part.

16. A feeder device for feeding granular material from a container to a channel for air-flow-based transport of the granular material in an agricultural implement, the feeder device comprising:
   a feeder space, which is adapted to receive a metering rotor, and
   a rotor apparatus according to claim 1, wherein the rotor apparatus is positionable in the feeder space, so that during operation, air leakage from the channel, past the feeder device and to the container is <30 m$^3$/h.

17. An agricultural implement for spreading granular material on the ground, on which the agricultural implement is traveling, comprising a feeder device according to claim 16.

18. A method for feeding granular or powdered material from an agricultural implement to the ground on which the agricultural implement is traveling, comprising:
   arranging a rotor apparatus according to claim 1 in a feeder space of a feeder device associated with the agricultural implement, and
   using the rotor apparatus arranged in the feeder device to feed the granular or powdered material from a container to a channel for air-flow-based transport of the granular or powdered material.

19. The method according to claim 18, wherein, during said feeding, an air pressure in the container differs from the ambient air pressure of the agricultural implement by less than 1%, and in which an air pressure in the channel differs from the ambient air pressure by more than 1-15%.

20. The method according to claim 18, wherein a leakage from the channel past the feeder device and to the container is <6% of an airflow achieved in the channel.

\* \* \* \* \*